May 14, 1929. H. HEUER 1,712,616
HARVESTER
Filed June 4, 1925 3 Sheets-Sheet 2

Inventor
Henry Heuer
By C.A.Snow&Co.
Attorneys

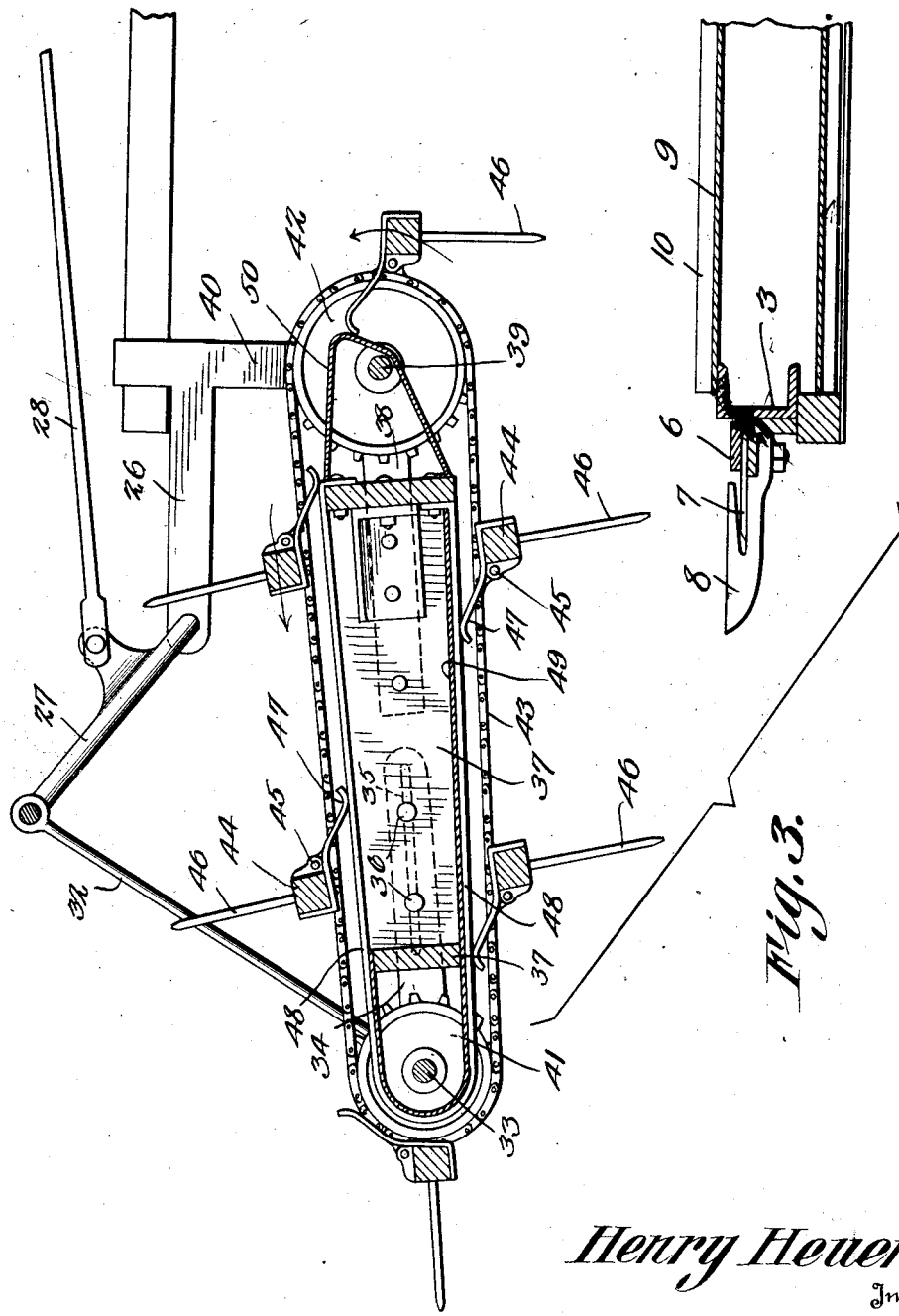

Patented May 14, 1929.

1,712,616

UNITED STATES PATENT OFFICE.

HENRY HEUER, OF COBB, WISCONSIN.

HARVESTER.

Application filed June 4, 1925. Serial No. 34,925.

This invention relates to harvesters designed primarily for harvesting pea vines, the same being an improvement upon the structure disclosed in my copending application filed September 13, 1924, Serial No. 737,527.

It is an object of the invention to provide a simple and compact structure which, when drawn over a field, will pick up the vines and direct them properly into position for engagement by the sickle knives.

A further object is to provide vine lifting and feeding means designed to be substituted for the ordinary reel used in connection with the sickle bar of a harvester and which serves both to lift the vines and to convey them to a delivery belt.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 3 is an enlarged vertical longitudinal section through the lifting and feeding mechanism, the sickle bar and adjacent parts being also shown.

Figure 1:
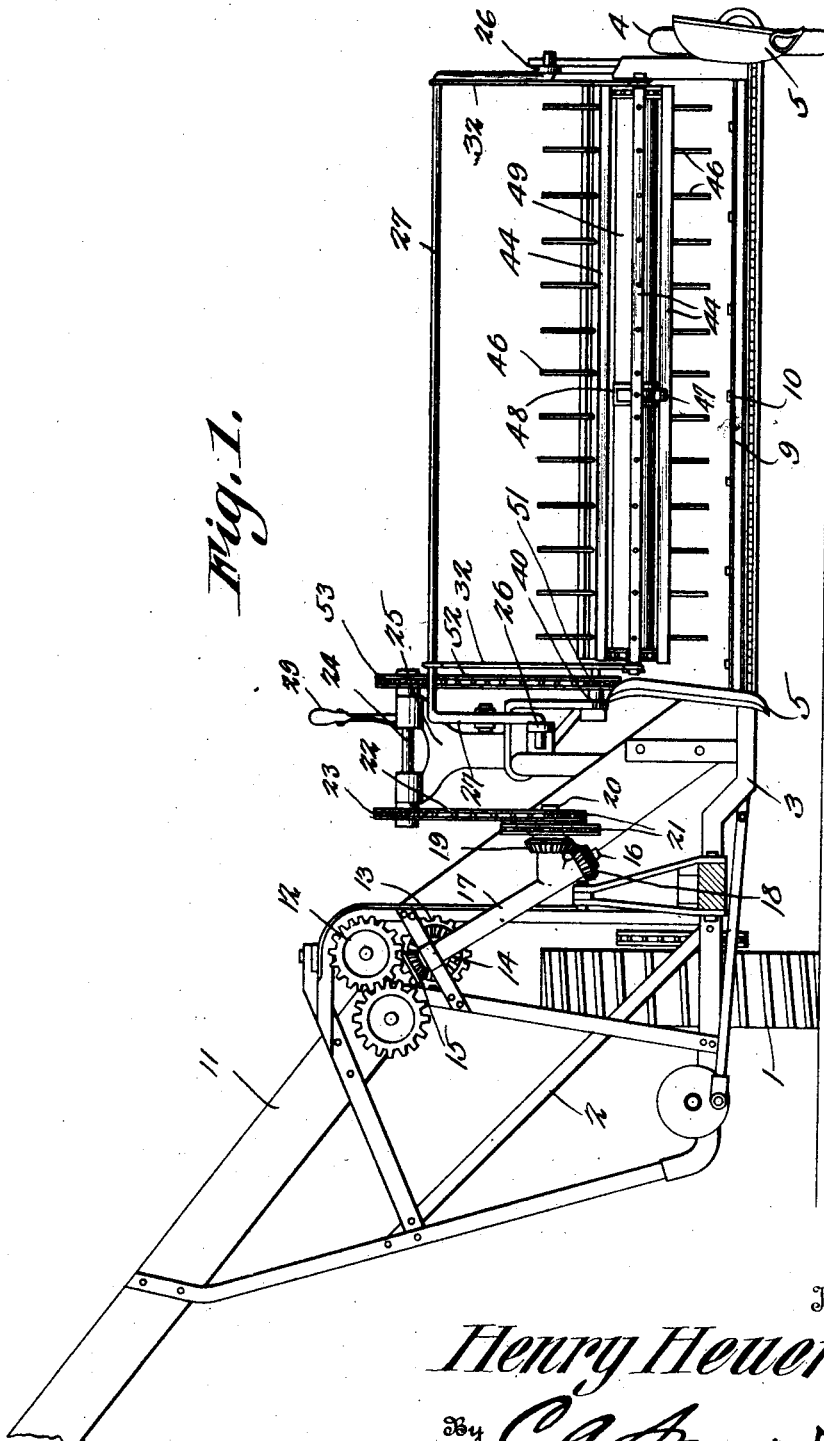
Figure 1 is a front elevation of the apparatus constituting the present invention.

Referring to the figures by characters of reference, 1 designates a ground engaging wheel supporting a frame indicated generally at 2 and which frame has a lateral extension 3 provided, at its outer end, with a supporting wheel 4. Forwardly extending gathering fingers 5 project from the lateral extension 3 of the frame 2 and mounted for reciprocation back of these fingers is a sickle bar 6 the blades 7 of which work within guard fingers 8, such as ordinarily provided. An endless belt 9 having transverse cleats 10 is mounted to travel longitudinally of the frame extension 3, or, in other words, transversely of the direction of movement of the machine and the upper flight of this conveyor is so located as to receive the cut vines as they are directed rearwardly from the sickle bar. The mechanism operating this conveyor is not important and any suitable means may be provided. For that reason the same has not been shown or described in detail. It might be stated, however, that this conveyor mechanism, which includes upwardly extending portions located within frames 11, is adapted to deliver the cut vines laterally from the machine and the said conveyor mechanism, which may be driven by the wheel 1 through suitable mechanism provided therefor, includes a gear 12 which meshes with another gear 13 formed integral with or secured to a beveled pinion 14. This pinion, in turn, meshes with and is adapted to drive a pinion 15 secured to one end of a shaft 16 which is journaled within a sleeve 17 and has a pinion 18 secured to its lower end. This last pinion meshes with another pinion 19 secured to a short shaft 20 which is journaled within one side portion of the sleeve 17 and carries sprockets 21 one of which is adapted to transmit motion through a chain 22 to another sprocket 23 secured to a transverse shaft 24 journaled in an upstanding yoke or frame 25.

The mechanism thus far described corresponds with that disclosed in my application hereinbefore mentioned and, in itself, constitutes no part of the present invention.

The extension 3 of the frame 2 is provided adjacent the respective gathering fingers 5 with side arms 26 suitably supported by said extension 3. In these side arms are journaled the ends of a bail 27 to one side of which is connected a rod 28 extending from an adjusting lever 29. By means of this lever the bail can be swung back and forth and, by the use of a toothed segment 30 and dog 31, the lever and the bail can be held in any position to which they may be moved.

Extending downwardly from the end portions of the bail are links 32 the lower ends of which are pivotally connected as at 33, to the forward ends of strips 34 which are slotted longitudinally as at 35. Bolts 36 are extended through these slots and serve to hold the strips 34 to the sides of a frame 37 supported above and extending forwardly beyond the sickle bar 6. Arms 38 are secured to and extend rearwardly from the sides of the frame 37 and are pivotally mounted on a transverse shaft 39 suitably supported below the arms 26 in bearings 40 provided therefor. The pivotal connection 33 constitutes a shaft carrying sprockets 41 and the shaft 39 also carries sprockets 42. Mounted on these sprockets are endless chains 43 connected by cross bars 44 which are hingedly connected to the chains as shown at 45. Extending from each of these bars is a series of lifting tines or fingers 46 and a spring arm 47 also extends from each bar. These arms are adapted to travel successively along a slat 48 which is secured on and extends longitudinally of the frame 37 and also extends downwardly in front of the frame along a line concentric with the shaft 33 and thence rearwardly along the bottom of the frame. This has been illustrated clearly in Figure 3. The bottom portion of the frame 37 is closed with sheet metal or the like indicated at 49, this sheet metal extending upwardly in front of shaft 33 and rearwardly to the front end of the frame 37. A shield 50 formed of sheet metal can also be extended from the rear end of the frame 37 around shaft 39 so as to close the space between the frame and said shaft.

When the machine is moved forwardly the sickle bar will be operated by the usual or any preferred mechanism so as to cut the vines standing in the path thereof. It has been found in practice, however, that many vines lie close to the ground and will pass under the sickle bar. For the purpose of overcoming this objection and assuring the harvesting of practically all of the vines, the structure shown in Figure 3 has been provided. By means of lever 29 the frame 37 can be swung downwardly at any desired angle so that the tines or fingers 46, as they travel downwardly across the front end of the frame 37, will sweep into engagement with the low lying vines and will drag them rearwardly and upwardly so as to bring them into engagement with the reciprocating sickle bar. The vines will be pulled from the sickle bar by these fingers so as to be deposited on the conveyor 9 and will thus be carried laterally and delivered from the machine in a manner which will be obvious. As the chains 43 are actuated the bars 44 will be caused to travel in the direction indicated by the arrows in Figure 3 and the spring fingers 47 will be brought successively into contact with the slat 48 so as to hold the fingers or tines 46 extended outwardly as shown.

As the tines move rearwardly after passing downwardly in front of shaft 33 they will be free to yield slightly under the pressure exerted thereagainst by the vines, this yielding resulting from the resiliency of the fingers 47. After the vines have been drawn by the fingers onto the conveyor 9, the spring fingers 47 will pass off of the slat 48 and the shield 50 and thus allow the gathering fingers or tines 46 to hang freely as shown at the right of Figure 3 until they are swung around into the position shown at the top of Figure 3 by contact with the shield.

It might be stated that motion is to be transmitted to shaft 39 by any suitable mechanism. For example sprocket 51 can be secured thereto and will receive motion through a chain 52 from a sprocket 53 on the shaft 24.

By providing the adjustably mounted side strips 34, the distance between the shafts 33 and 39 can be lengthened or shortened as preferred and chains 43 longer or shorter than those illustrated can be used.

Figure 2:
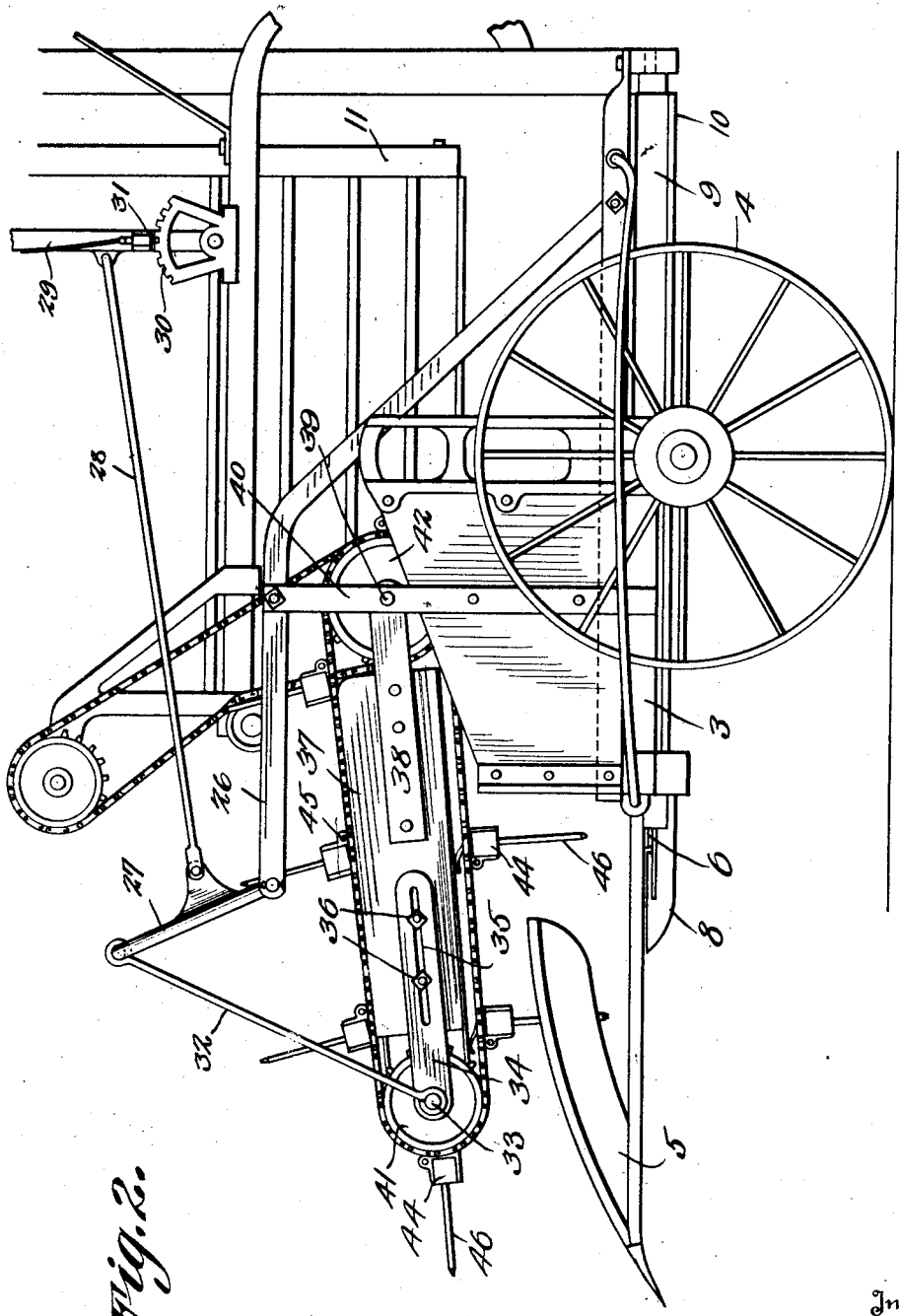
Figure 2 is a side elevation thereof.

In Figures 2 and 3 the lifting fingers 46 and the parts supporting the same are shown raised to an intermediate position.

What is claimed is:

A vine lifting and feeding attachment for harvesters including a shaft mounted for rotation, a frame mounted to swing about the shaft, bearing strips adjustably connected to and extending from the frame, a shaft journalled therein, sprockets upon the two shafts, parallel chains mounted on the sprockets and extending over and under the frame, cross bars hingedly connected to the chains, said bars being parallel, a series of lifting tines extending from each bar, a spring arm fixedly connected to and extending from each bar, slats secured to the frame and constituting tracks for the spring arms thereby to hold the bars normally pressed yieldingly against the chains with the tines extending outwardly from the chains, a shield extending around the pivot shaft and carried by the frame, said shield constituting means for engagement by the spring arms on reaching one end portion of the attachment to maintain the tines in downwardly extended positions during a portion of their upward movement and to invert the tines to upwardly extended positions during their forward movement, and means under the control of the operator for swinging the frame and the parts carried thereby about the pivot shaft.

In testimony that I claim the foregoing as my own, I have hereto affixed my signature.

HENRY HEUER.